(12) United States Patent
Heartsfield et al.

(10) Patent No.: US 7,450,967 B1
(45) Date of Patent: Nov. 11, 2008

(54) CONNECTION OF ONE OR MORE TRANSCEIVERS AT A CELLULAR BASE STATION TO ONE OR MORE CONTROL AND RADIO INTERFACES

(75) Inventors: William D. Heartsfield, Valrico, FL (US); Christopher Erwin, Wesley Chapel, FL (US)

(73) Assignee: Cingular Wireless II, LLC, Atlanta, GA (US)

( * ) Notice: Subject to any disclaimer, the term of this patent is extended or adjusted under 35 U.S.C. 154(b) by 123 days.

(21) Appl. No.: 10/882,704

(22) Filed: Jul. 1, 2004

Related U.S. Application Data (60) Provisional application No. 60/533,597, filed on Dec. 31, 2003.

(51) Int. Cl.
*H04B 1/38* (2006.01)
(52) U.S. Cl. .................. 455/559; 455/561; 455/560; 361/724; 379/325; 379/22
(58) Field of Classification Search ......... 455/560–561, 455/562.1, 550.1, 445, 557, 559; 379/325–328; 710/106; 439/502, 106; 361/724–727
See application file for complete search history.

(56) References Cited

U.S. PATENT DOCUMENTS

| | | | | |
|---|---|---|---|---|
| 3,866,996 A | * | 2/1975 | Elkins | ..................... 439/404 |
| 5,353,334 A | * | 10/1994 | O'Sullivan | ................... 455/557 |
| 5,544,222 A | * | 8/1996 | Robinson et al. | ............ 455/557 |
| 5,887,255 A | * | 3/1999 | Jackson et al. | ........... 455/426.1 |
| 6,163,595 A | * | 12/2000 | Parker et al. | ................... 379/22 |
| 6,498,890 B1 | * | 12/2002 | Kimminau | ................... 385/134 |
| 6,580,925 B2 | * | 6/2003 | Ma et al. | ..................... 455/560 |
| 6,681,123 B2 | * | 1/2004 | Leppa et al. | ................. 455/561 |
| 6,785,558 B1 | * | 8/2004 | Stratford et al. | ............. 455/561 |
| 6,839,571 B2 | * | 1/2005 | Bobier | ....................... 455/561 |
| 6,871,081 B1 | * | 3/2005 | Llewellyn et al. | ........... 455/561 |
| 6,947,756 B2 | * | 9/2005 | Khan et al. | ............... 455/456.5 |
| 6,959,205 B2 | * | 10/2005 | Yambe | ........................ 455/557 |
| 6,975,884 B2 | * | 12/2005 | Seick et al. | .................. 455/559 |
| 7,149,546 B1 | * | 12/2006 | Hollen | ........................ 455/561 |

* cited by examiner

*Primary Examiner*—Sharad Rampuria
(74) *Attorney, Agent, or Firm*—Amin, Turocy & Calvin, LLP (57) ABSTRACT

In a combination of a transceiver cabinet housing a plurality of transceivers and one or more DECON boards for supporting said transceivers, and a cable for connecting one or more of said transceivers through a selected DECON board to selected control and radio interfaces, a first end of the cable is connected to the selected DECON board, and the second end of the cable is split into and includes multiple discrete portions, each discrete portion being associated with one particular transceiver supported by the selected DECON board such that each discrete portion, and thus one particular transceiver, can be connected to a particular RTT board of a control and radio interfaces.

9 Claims, 8 Drawing Sheets

CONNECTION OF ONE OR MORE TRANSCEIVERS AT A CELLULAR BASE STATION TO ONE OR MORE CONTROL AND RADIO INTERFACES

CROSS-REFERENCE TO RELATED APPLICATIONS

This application claims priority to U.S. Provisional Application Ser. No. 60/533,597 filed Dec. 31, 2003, the entire disclosure of which is incorporated herein by reference.

BACKGROUND OF THE INVENTION

1. Field of the Invention

The present invention relates to the field of telecommunications, and, more particularly, relates to the connection of one or more transceivers located at a cellular base station to one or more control and radio interfaces, through which the transceivers are operably connected via a trunk to a mobile switching station.

2. Description of Related Art

Figure 1:
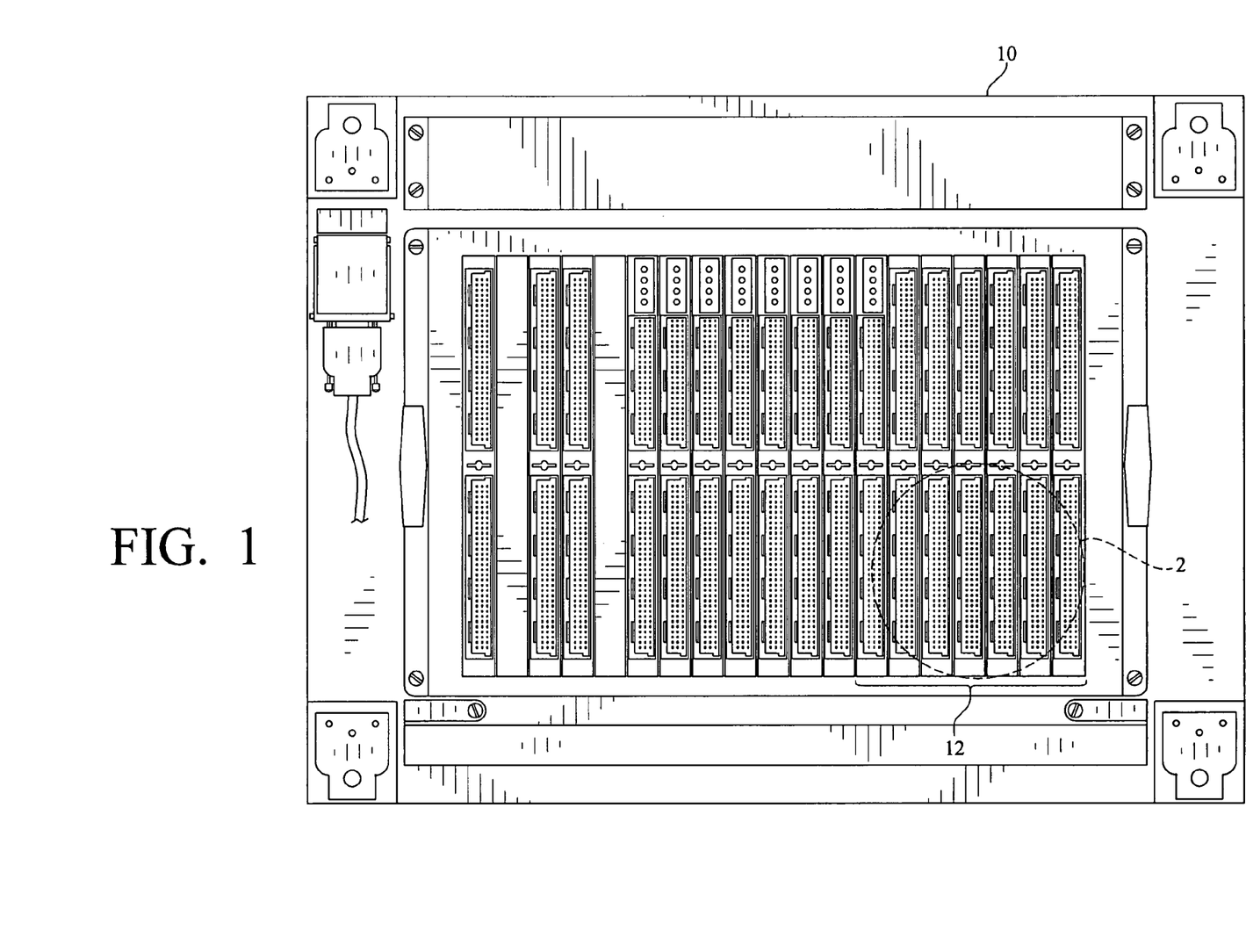
FIG. 1 is a plan view of an exemplary CRI.
Figure 2:
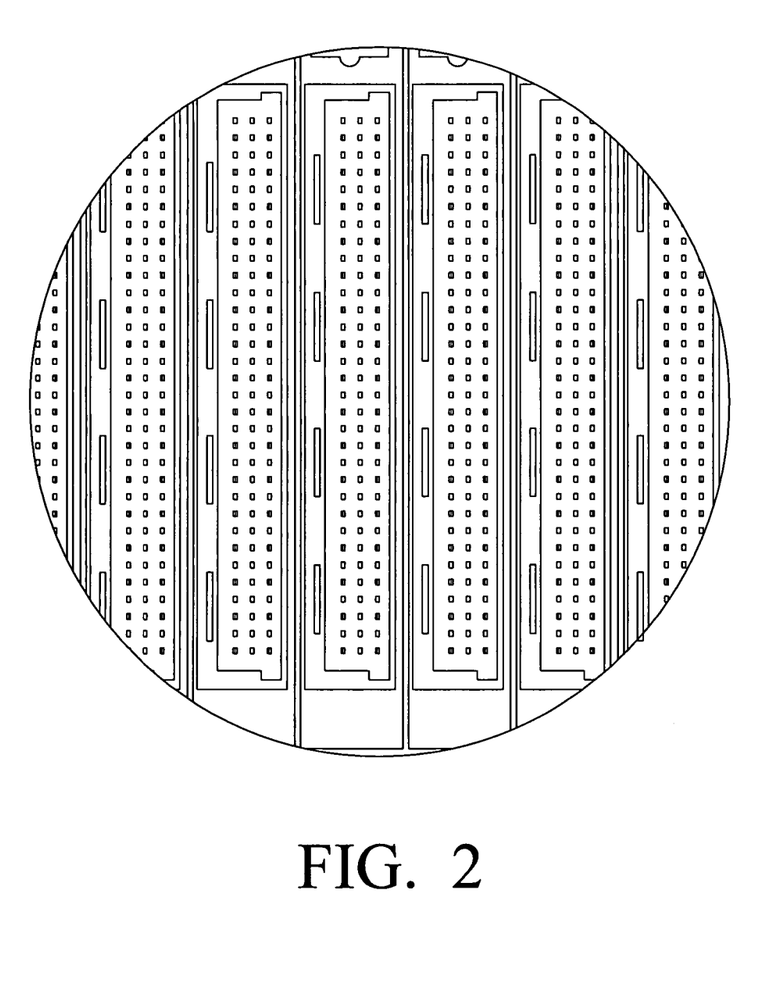
FIG. 2 is an enlarged view of a portion of the exemplary CRI of FIG. 1, illustrating the RTT boards resident in the CRI.
Figure 2A:
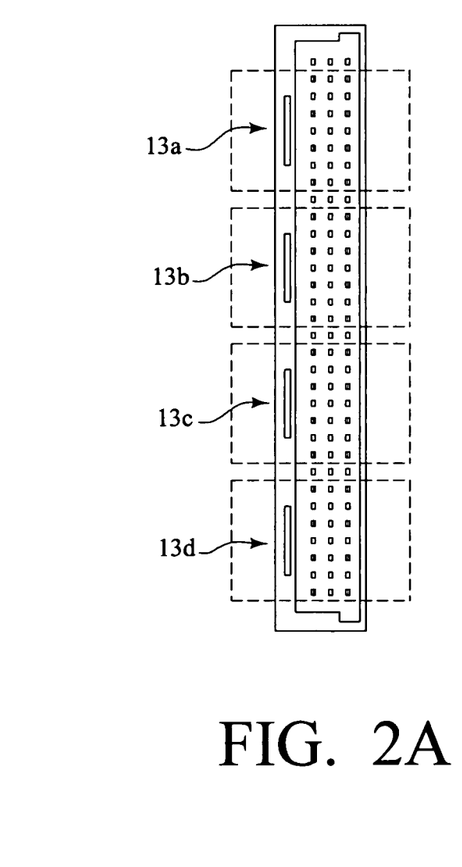
FIG. 2a is an enlarged view of a single RTT boards resident in the CRI of FIGS. 1 and 2.

In a typical cell site configuration, there is at least one trunk that connects the cellular base station, also known as a cell site, to a mobile switching station (MSC). In many cases, this trunk is a DS1 circuit, a four-wire digital circuit composed of twenty-four channels or "time slots" that is commonly referred to as a T1. Each channel of the T1 is capable of handling a single telephone conversation. At the cell site, each T1 is associated with a control and radio interface (CRI). The CRI is responsible for establishing communication between the cell site and the MSC. In this regard, the CRI includes a plurality of Radio Transmitter Termination (RTT) boards, each of which serves as an interface for up to four transceivers. FIG. 1 is a plan view of an exemplary CRI, illustrating a configuration in which there are six RTT boards (as best shown in FIG. 2).

At the cell site, the transceivers are located on cards in a transceiver cabinet. Also located in the transceiver cabinet are Digital Connection (DECON) boards which allow for connection of the transceivers to the CRI, as is further described below. In one common installation, the CRI is connected to three separate transceiver cabinets, each typically housing eight transceivers. In this regard, the twenty-four radios correspond with the twenty-four channels of the T1 (although one transceiver in each cabinet may be used for control functions).

The connection between the transceivers and the CRI in each cabinet is accomplished through CLINK cables. Specifically, each CLINK cable is connected to an RTT board of a CRI at one end and a DECON board associated with a transceiver cabinet at the other end. Each CLINK cable is designed for simultaneous connection of four transceivers in the transceiver cabinet to an RTT board of the CRI.

Since typical transceiver cabinets (for example, the Ericsson RBS 884 Macro product) actually have sixteen slots, by using physically smaller 200 mW transceivers (as opposed to 10 or 30 W radios which each occupy two slots), each transceiver cabinet can accommodate up to sixteen transceivers. Nevertheless, since the CLINK cable is designed for connection of radios in groups of four, adding a single transceiver in the transceiver cabinet would still use up four timeslots (or channels) of the T1 because of the design of the CLINK cable.

Thus, there is a need for an approach that facilitates connection of a single transceiver to an RTT board of a CRI, leaving remaining timeslots associated with the RTT board available for other usage. There is also a need for an approach that facilitates connection of multiple transceivers supported by a common DECON board to more than one RTT board, whether those RTT boards are associated with the same or different CRIs.

SUMMARY OF THE INVENTION

The present invention address the above-identified needs and others by splitting the RTT end of the CLINK cable into discrete portions, such that each transceiver can be individually connected to a selected RTT board of a control and radio interface. For example, in one exemplary implementation of the present invention, a single transceiver is added to a transceiver cabinet. By connecting only the corresponding discrete portion of the CLINK cable to the RTT board of the CRI, the remaining three timeslots of the T1 that are associated with that particular RTT board would remain available for other usage. For another example, in another exemplary implementation of the present invention, four transceivers are housed in a transceiver cabinet and connected to a DECON board in that cabinet. However, once connected to the DECON board, the individual discrete portions of the CLINK cable can be connected each to a separate RTT board, whether those RTT boards are associated with the same or different CRIs.

BRIEF DESCRIPTION OF THE DRAWINGS

Preferred and alternative embodiments are described with reference to the attached figures wherein like reference numerals indicate similar or identical features or functions, and wherein.

DETAILED DESCRIPTION OF THE INVENTION

The present invention relates to a the connection of one or more transceivers located at a cellular base station to one or more control and radio interfaces, through which the transceivers are operably connected via a trunk to a mobile switching station.

As described above, FIG. 1 is a plan view of an exemplary CRI 10, illustrating a configuration in which there are six RTT boards, which are generally and collectively indicated by reference numeral 12. FIG. 2 is an enlarged view of a portion of the exemplary CRI 10, further illustrating these RTT boards 12. Lastly, as best shown in the enlarged view of FIG. 2, each RTT board 12 has four discrete groupings of connector pins 13a, 13b, 13c, 13d, each grouping corresponding to a respective channel or timeslot (and including eight pins in this exemplary CRI 10), the importance of which is explained below.

Figure 4:
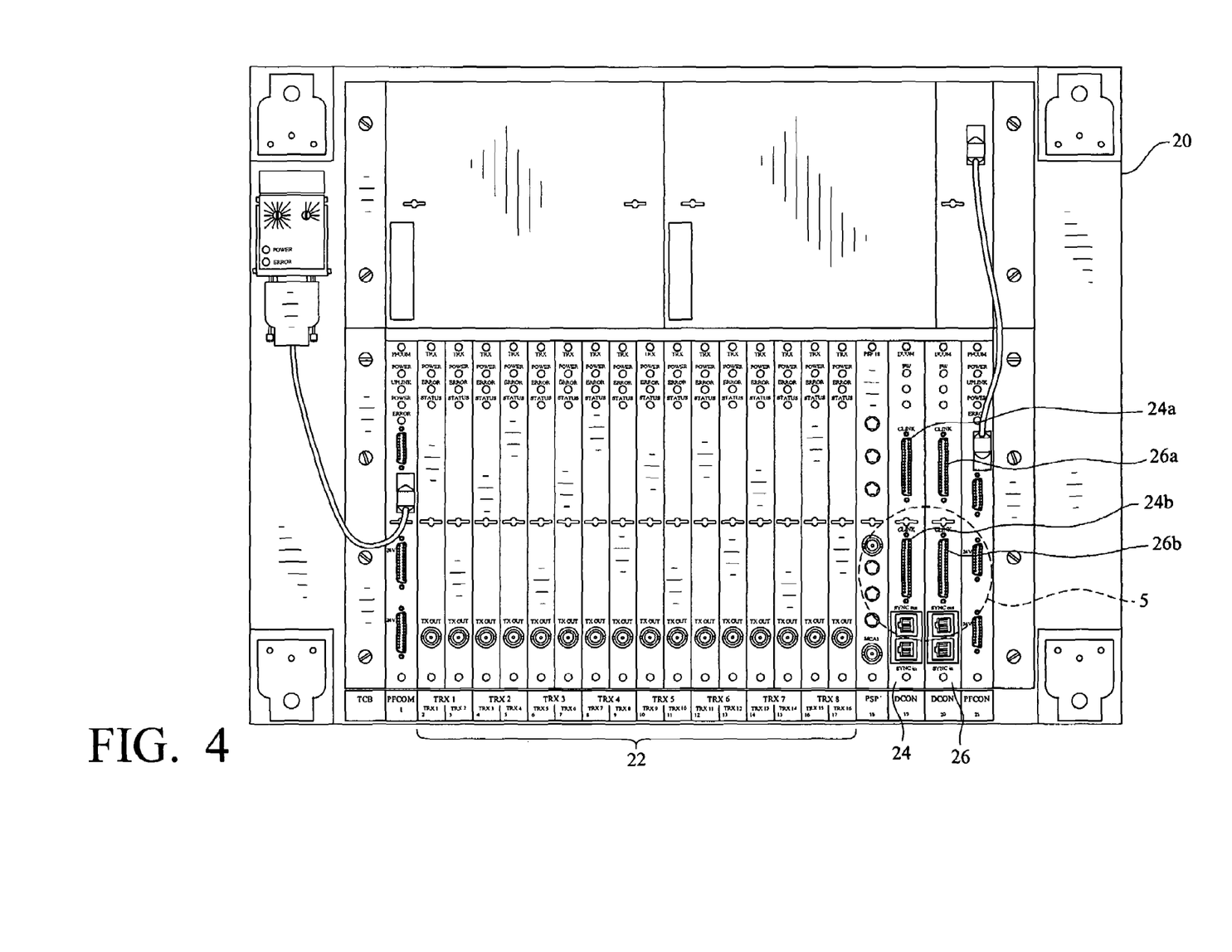
FIG. 4 is a plan view of an exemplary transceiver cabinet.
Figure 5:
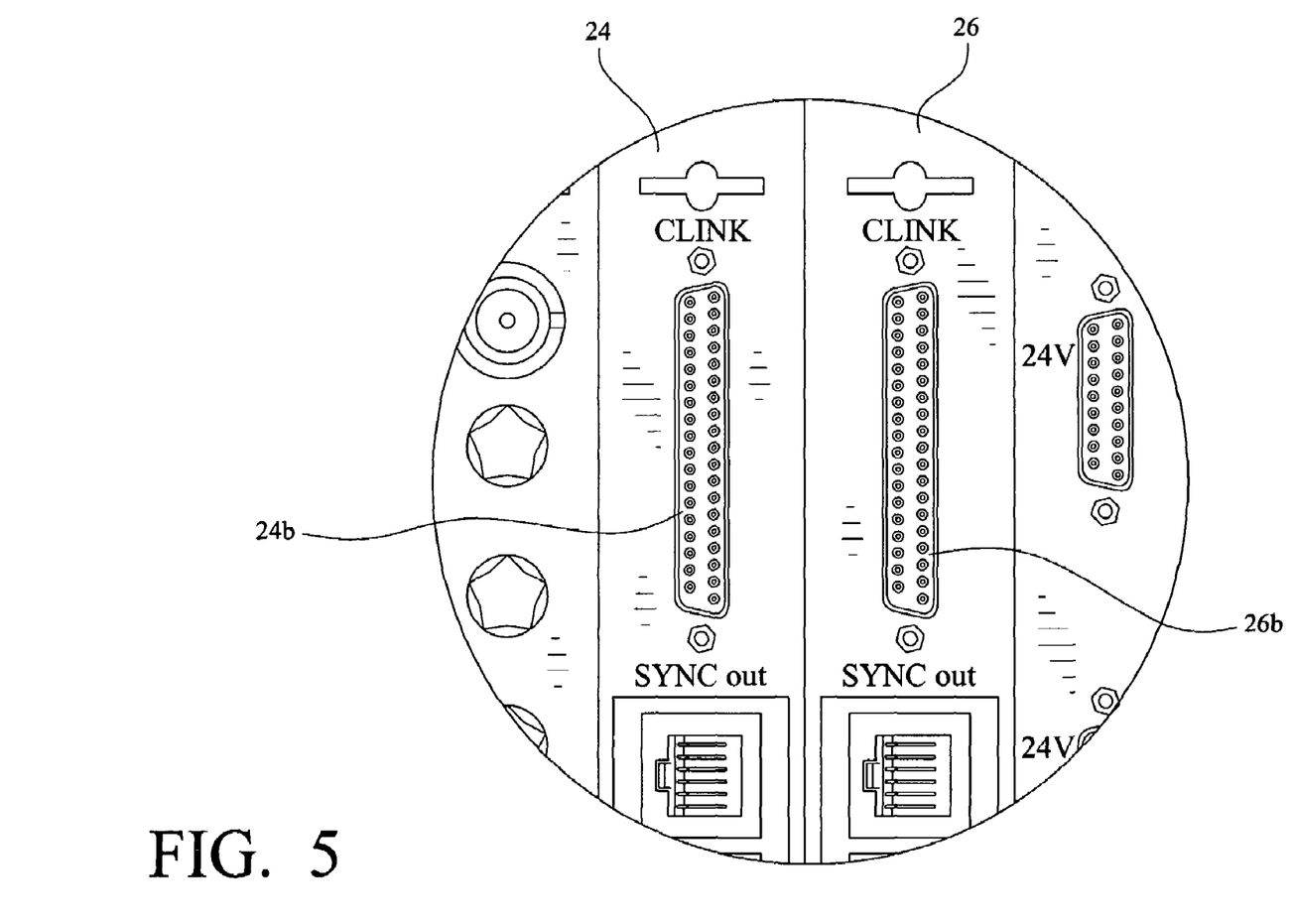
FIG. 5 is an enlarged view of a portion of the exemplary transceiver cabinet of FIG. 4, illustrating DECON boards resident in the transceiver cabinet.

Referring now to FIG. 4 and the enlarged view of FIG. 5, a transceiver cabinet 20 is illustrated housing sixteen transceivers, generally and collectively indicated by reference numeral 22, on cards within the cabinet 20. The illustrated transceiver cabinet 20 also houses two DECON boards 24, 26, each board having two inputs 24a, 24b, 26a, 26b. With sixteen transceivers 22, it should be apparent that each input 24a, 24b, 26a, 26b of the respective DECON boards 24, 26 is associated with four transceivers. In this regard, when only eight transceivers 22 are housed in the transceiver cabinet 20, only two inputs are needed; in other words, two inputs remain unused.

Figure 3:
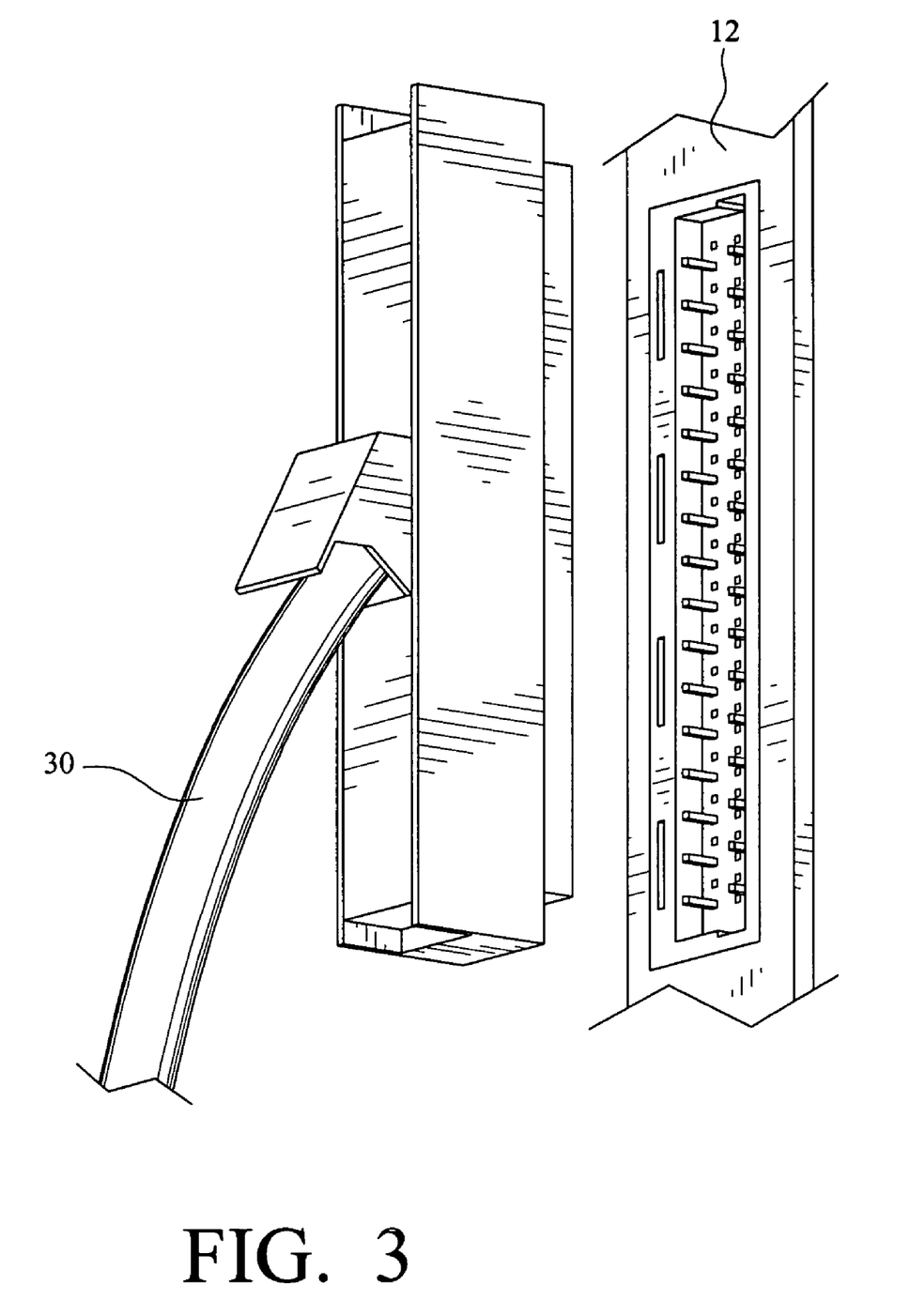
FIG. 3 is a perspective view illustrating the connection of one discrete end of the CLINK cable to an RTT board of FIG. 2.
Figure 6:
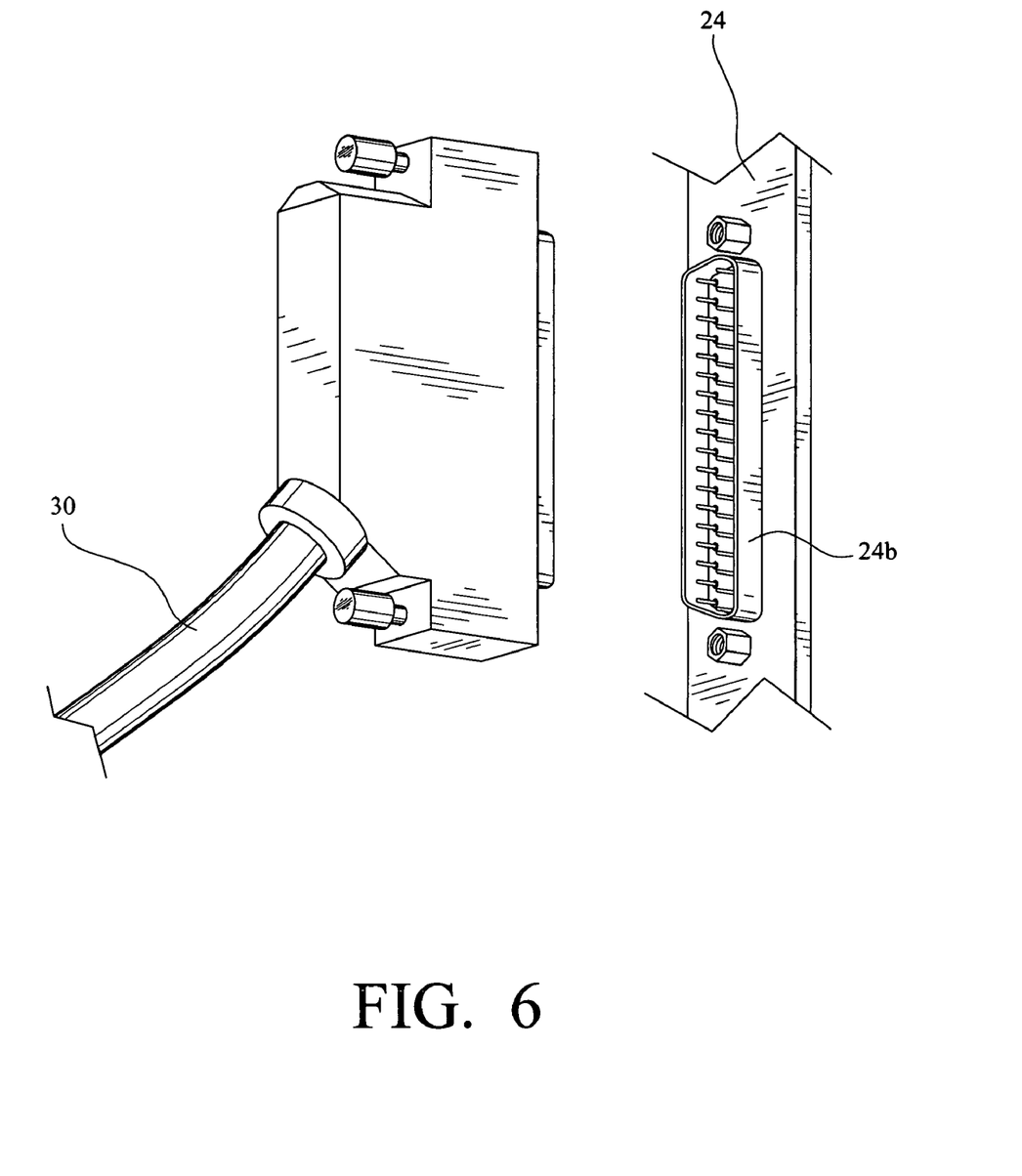
FIG. 6 is a perspective view illustrating the connection of one end of the CLINK cable to a DECON board of FIG. 5.

As mentioned above, a CLINK cable is designed for connection of transceivers in groups of four, with each CLINK cable being connected to and occupying all pin connections of an RTT board 12 of a CRI 10 at one end and one of the inputs 24a, 24b, 26a, 26b of a respective DECON board 24, 26 of the transceiver cabinet 20 at the other end. In this regard, FIG. 3 is a perspective view illustrating the connection of one discrete end of the CLINK cable 30 to the RTT board 12 of the CRI 10, and FIG. 6 is a perspective view, illustrating the connection of the opposite end of the CLINK cable to a DECON board 24 of the of the transceiver cabinet 20.

Figure 7:
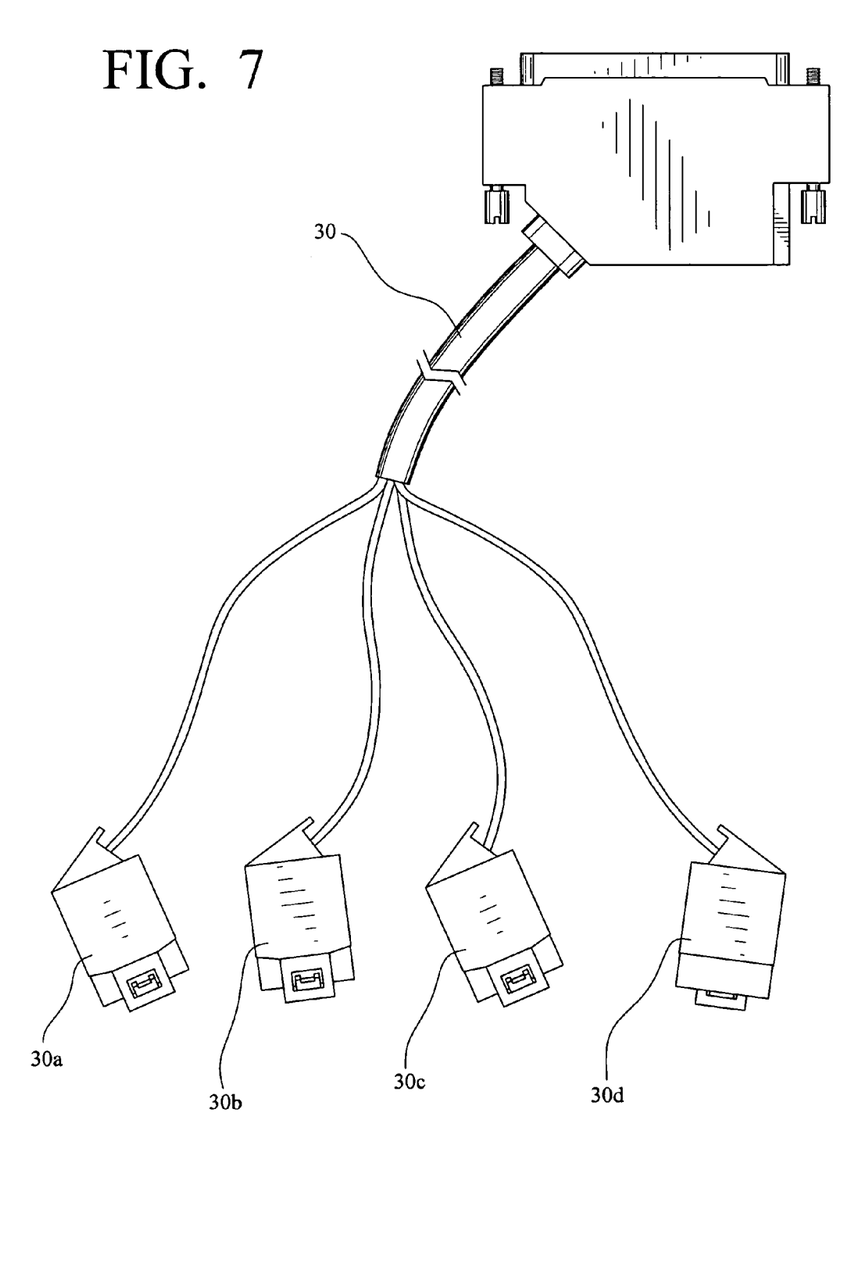
FIG. 7 is a perspective view of a CLINK cable, with the RTT end of the cable split into discrete portions in accordance with the present invention.

However, the method of the present invention contemplates splitting the RTT end of the CLINK cable 30, and FIG. 7 is a perspective view of a CLINK cable 30, with the RTT end of the cable 30 split into discrete portions 30a, 30b, 30c, 30d in accordance with the present invention. Specifically, when the CLINK cable is secured to a DECON board associated with a grouping of transceivers (such as the DECON boards 24, 26 illustrated in FIGS. 4-6), the four discrete portions 30a, 30b, 30c, 30d of the RTT side of the CLINK cable 30 can be individually secured to one or more of the discrete groupings of connector pins on the RTT boards (such as the RTT boards 12 illustrated in FIGS. 1-3). As a result, there is significant flexibility in the connection of one or more transceivers to the T1.

For example, in one exemplary implementation of the method of the present invention, a single transceiver is added to a transceiver cabinet. Thus, by connecting only the corresponding discrete portion of the CLINK cable to the RTT board of the CRI, the remaining three timeslots of the T1 that are associated with that particular RTT board would remain available for other usage.

Figure 8:
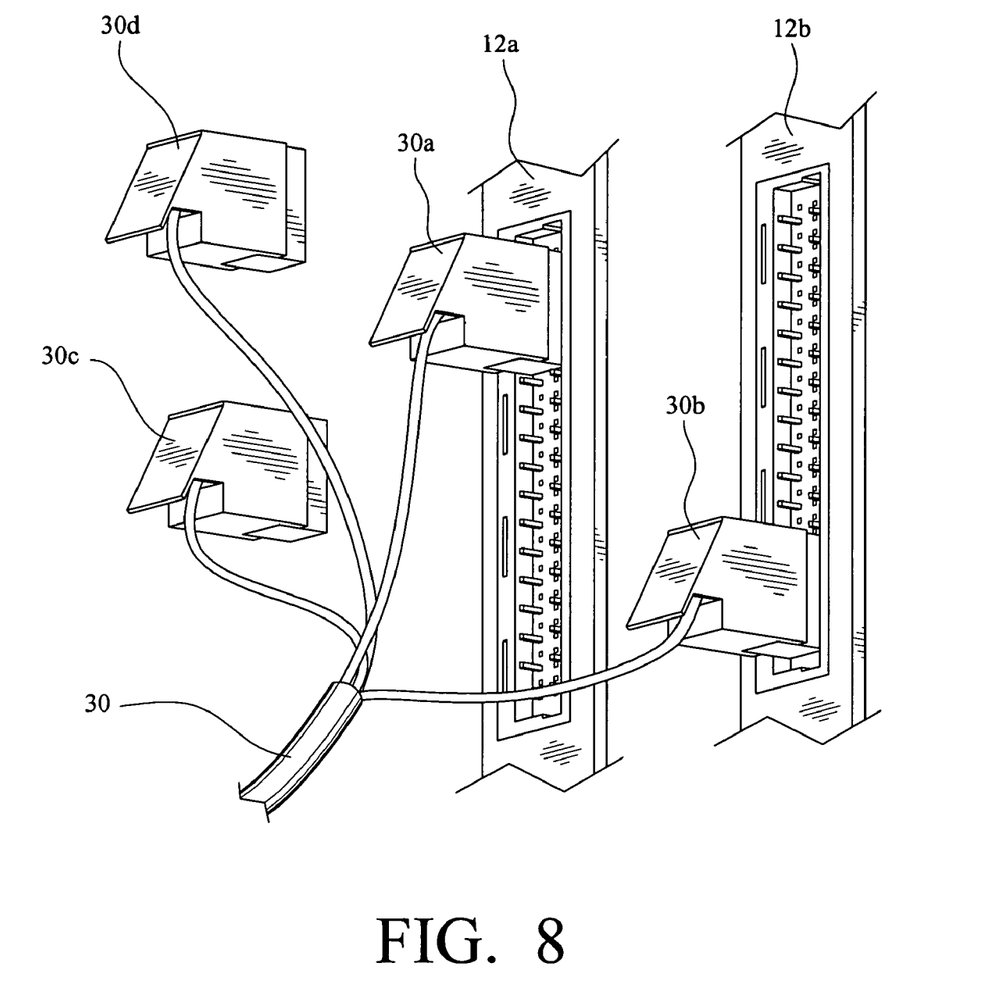
FIG. 8 is illustrates the connection of two individual discrete portions a the CLINK cable, each to a separate RTT board in accordance with the present invention.

For another example, in another exemplary implementation of the method of the present invention, four transceivers are housed in a transceiver cabinet and connected to a DECON board in that cabinet. However, once connected to the DECON board, the individual discrete portions of the CLINK cable can be connected each to a separate RTT board, whether those RTT boards are associated with the same or different CRIs. This is illustrated in FIG. 8, in which a first discrete portion 30a of the CLINK cable 30 is connected to a selected grouping of connector pins on one RTT board 12a, and a second discrete portion 30b of the CLINK cable 30 is connected to a selected grouping of connector pins on another RTT board 12b.

It will be obvious to those skilled in the art that further modifications may be made to the embodiments described herein without departing from the spirit and scope of the present invention.

What is claimed is:

1. In a cellular telecommunication system base station, a combination of (a) a transceiver cabinet housing a plurality of radio transceivers and one or more Digital Connection (DECON) boards for supporting said transceivers, and (b) a cable for connecting one or more of said transceivers through a selected DECON board to selected control and radio interfaces, wherein a first end of said cable is connected to the selected DECON board, and the second end of said cable includes multiple discrete connector portions, each discrete connector portion being associated with a particular transceiver supported by the selected DECON board, and wherein each discrete connector portion can be individually connected to a Radio Transmitter Termination (RTT) board of one of the control and radio interfaces.

2. The combination as recited in claim 1, wherein each RTT board has four discrete groupings of connector pins, each connector pin grouping being associated with a particular channel such that connection of one of the discrete connector portions of the cable to a selected grouping of connector pins operably connects the transceiver associated with that discrete connector portion of the cable to the particular channel.

3. The combination as recited in claim 1, wherein when a single transceiver is provided in the transceiver cabinet, the associated discrete connector portion of the cable is connected to an RTT board of a particular control and radio interface, thereby operably connecting that single transceiver to a single channel.

4. The combination as recited in claim 1, wherein a first discrete connector portion of the cable is connected to a first RTT board, and a second discrete connector portion of the cable is connected to a second RTT board.

5. The combination as recited in claim 4, wherein said first RTT board is associated with a first control and radio interface and said second RTT board is associated with a second control and radio interface.

6. A method of connecting one or more radio transceivers located at a cellular base station to a control and radio interface, comprising the steps of:
   connecting a first end of a Communication Link (CLINK) cable to a Digital Connection (DECON) board of a transceiver cabinet associated with said one or more transceivers;
   splitting a second end of said CLINK cable into discrete connector portions, each discrete connector portion being associated with a transceiver supported by said DECON board; and
   connecting the discrete connector portions that correspond to the one or more transceivers to the control and radio interface, each to a selected Radio Transmitter Termination (RTT) board of the control and radio interface.

7. The method as recited in claim 6, wherein each RTT board has four discrete groupings of connector pins, each such grouping being associated with a particular channel, such that connection of one of the discrete connector portions of the CLINK cable to a selected grouping of connector pins operably connects the transceiver associated with that discrete connector portion of the CLINK cable to the particular channel.

8. A method of connecting multiple radio transceivers supported by a common Digital Connection (DECON) board to more than one Radio Transmitter Termination (RTT) board in a cellular telecommunication system base station, comprising the steps of:
   connecting a first end of a Communication LINK (CLINK) cable to a DECON board supporting the multiple transceivers;
   connecting a first discrete connector portion of a second end of the CLINK cable to a first RTT board; and
   connecting a second discrete connector portion of the second end of the CLINK cable to a second RTT board.

9. The method as recited in claim 8, in which said first RTT board is associated with a first control and radio interface and said second RTT board is associated with a second control and radio interface.

* * * * *